July 18, 1939.      N. B. CHALLONER      2,166,520
TRUCK SIGNAL
Filed Feb. 28, 1938
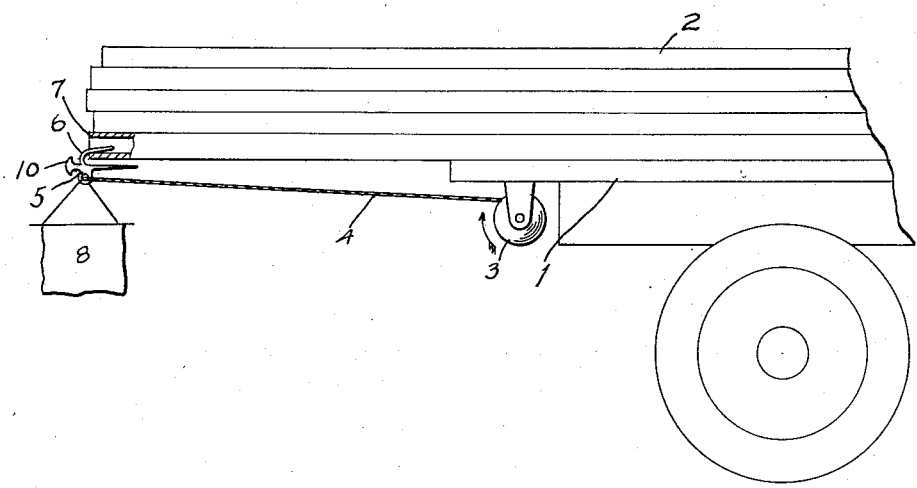
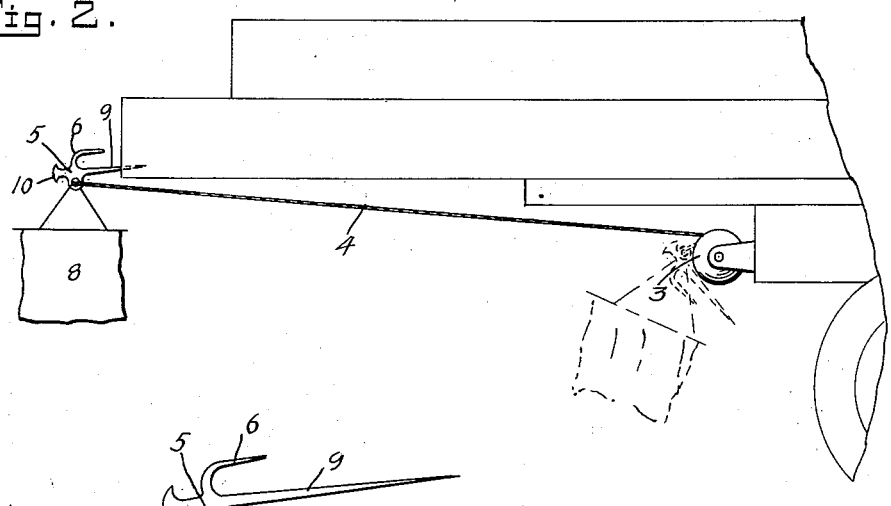
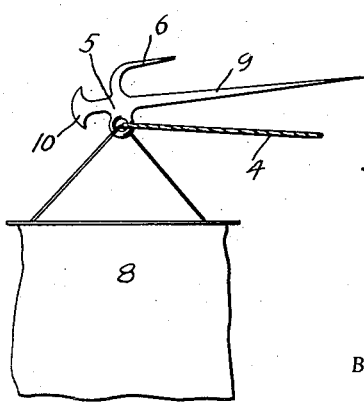
INVENTOR:
N. B. CHALLONER.
BY
ATTORNEY.

Patented July 18, 1939

2,166,520

UNITED STATES PATENT OFFICE 2,166,520

TRUCK SIGNAL

Neville B. Challoner, Los Angeles, Calif.

Application February 28, 1938, Serial No. 192,986

4 Claims. (Cl. 40—128)

This invention relates to warning signals and has particular reference to a signal for use on self propelled commercial vehicles.

It is a traffic requirement that trucks and other commercial vehicles carrying overhanging loads must have attached a red flag to the overhanging portion of the load. Partly because of carelessness on the part of the truck crew and mostly, perhaps, because of the difficulty of attaching such flags to the various kinds of loads carried, it is a common occurrence for such flaps to become disengaged and lost. And it happens frequently that the flag is mislaid after removal from the load and that, for this reason, no flag is available to serve the next load on the same truck. But even if not lost, it is often trampled upon and torn, and so made useless.

In view of the foregoing, it is the main object of the invention to provide a simple and efficient signal flag attachment mountable on any truck. It is a further object of the invention to provide an extensible device capable of ready use in connection with truck loads of various shapes and character. Another object is to provide a device which, when not in use, is safely carried on the truck in an out of the way position.

The various objects and the many advantageous features of the invention are fully set forth in the following description, and a drawing is hereto annexed in which a preferred form of the invention is illustrated.

In the drawing:

Fig. 1 is a side elevation of the rear end of a load carrying truck to which the device of the invention is attached, Fig. 2 is a similar view, showing a different method of suspending the signal flag of the invention from a load, and Fig. 3 is a view, on a larger scale, of a signal flag held suspended from the attaching member of the invention.

The truck may be of any known commercial type having a chassis flooring 1, upon which the load 2 is shown placed, the load, in Fig. 1, being pipe or tubing. In any suitable, out of the way but readily accessible position is mounted a springheld reel 3, such as used in fishing tackle or on trolley cars to control the trolley pole. A cord or cable 4 is fastened to and wound upon this reel and it may be extended from the reel against the tension of the reel spring. An attaching member 5 is fastened to the free end of this cord, and it is shown made with a hook portion 6, insertable in the end of the tubing 7 of the load. A signal flag 8 is held suspended from this member in any suitable manner.

The operation of the device should be clear to anyone. After the load is placed, it is merely required to reach under the flooring to take hold of the member 5 and to draw it to the rear end of the load for attachment thereto. Before unloading is commenced, the member is withdrawn from the load and will, by the tension of the reel spring, be pulled back to the reel, there to assume the position substantially as indicated in Fig. 2, in which position it will remain until again needed.

But pipes are not the only load material. At times, the load consists of articles which do not present large cavities into which the hook 6 of the attaching member may be seated. It may, for this reason, be advisable to provide the latter with elements of different shapes. If the load, for example, consists of logs, as indicated in Fig. 2, it may be preferred to provide a pointed portion 9 on the member 5, to be pushed into the endwood of the logs. It may even be necessary to provide the member with a head 10, for driving the member into the material of the load. The pointed end, or spike 9 is also readily insertable in the crack between boxes or creates to maintain the flag securely in position.

In view of the foregoing, it is seen that a device is provided which may readily be mounted on the truck body in the most advantageous position and high enough above the ground to prevent the flag from trailing thereon. Also that the flag is held suspended from an attachment member having elements of various shapes best suited for use in connection with the particular kind of load carried.

While the drawing illustrates a preferred form of the invention, I do not wish to be limited to the exact structure disclosed, but reserve the right to make changes and modifications within the scope of the following claims. It was stated above, for example, that the reel should be placed in an out of the way position. This is suggested in order to protect the reel from damage, but it should also be borne in mind that, the more prominently the flap is exhibited at all times, the greater the usefulness of the device. No particular position can therefore be assigned to the reel, but any position which will not interfere with the operation of the device may be selected.

I claim:

1. The combination with a truck, of a danger signal comprising a springheld reel mounted on the truck, a cord fastened to and extensible from said reel, a member on the free end of said cord having elements shaped to engage loads of various kinds on the truck, and a signal flag secured to said member and freely suspended therefrom.

2. The combination with a truck, of a danger signal comprising a springheld reel mounted on the truck, a cord mounted on and extensible from said reel, a member on the free end of said cord shaped to engage various kinds of loads on the truck and made with an eye, and a signal flag freely and nondetachably fastened in said eye.

3. A danger signal for automobile trucks comprising, a springheld reel mountable on a truck, a cord wound upon and extendible from said reel, an attachment device fastened to the free end of said cord, said device including a pointed portion, a hook portion and a perforated portion, and a signal member seated in and held freely suspended from said perforated portion.

4. A danger signal for automobile trucks comprising, a springheld reel mountable on a truck, a cord wound upon and extendible from said reel, an attachment device fastened to the free end of said cord, said device including a pointed portion, a hook portion, a driving head, and a perforated portion, and a signal member seated in and held freely suspended from said perforated portion.

NEVILLE B. CHALLONER.